United States Patent [19]

Papazian et al.

[11] Patent Number: 5,567,490

[45] Date of Patent: Oct. 22, 1996

[54] WHITE THERMAL CONTROL SURFACES

[75] Inventors: Harold A. Papazian, Littleton; Donald F. Shepard, Evergreen; Edward A. Pierson, Littleton, all of Colo.; Michael J. Gordon, Buellton, Calif.

[73] Assignee: Martin Marietta Corporation, Denver, Colo.

[21] Appl. No.: 459,124

[22] Filed: Jun. 2, 1995

Related U.S. Application Data

[62] Division of Ser. No. 48,774, Apr. 16, 1993, Pat. No. 5,476,696.

[51] Int. Cl.$^6$ .............................. B32B 18/00; C23C 4/10
[52] U.S. Cl. .................. 428/34.4; 428/34.6; 428/328; 428/329; 428/331; 428/702; 206/305; 206/524.3; 427/452; 427/453; 427/455; 427/456
[58] Field of Search .................................. 427/453, 452, 427/455, 456; 428/34.4, 34.6, 328, 329, 331, 702; 206/305, 524.3

[56] References Cited

U.S. PATENT DOCUMENTS

| | | | |
|---|---|---|---|
| 3,847,639 | 11/1974 | Broll et al. | 106/288 B |
| 4,680,048 | 7/1987 | Motoki et al. | 65/17 |
| 4,877,705 | 10/1989 | Polidor | 428/34.6 |
| 5,024,423 | 6/1991 | Matsumoto et al. | 266/283 |
| 5,032,420 | 7/1991 | Shobert et al. | 427/106 |
| 5,110,774 | 5/1992 | Ogura | 501/126 |

OTHER PUBLICATIONS

Publication "Principles and Techniques of Radiation Hardening", by Normal J. Rudie, vol. 3, Third Edition, pp. 31–36, Western Periodicals Company, 1986 (no month date).
Publicatin "Journal of Material Science and Letters" (1991), pp. 1171–1172 (no month date).

*Primary Examiner*—Katherine Bareford
*Attorney, Agent, or Firm*—Tarolli, Sundheim, Covell, Tummino & Szabo

[57] ABSTRACT

The present invention resides in a white thermal control surface resistant to darkening due to exposure to X-rays and ultraviolet radiation. The surface comprises a substrate and a ceramic zirconium orthosilicate coating on said substrate. The zirconium orthosilicate coating is obtained by plasma-spray applying particles of zirconium orthosilicate onto the substrate. The particles of zirconium orthosilicate are doped with an oxide of a +3 valent metal. The metal ions of said +3 valent metal oxide are dispersed substantially uniformly throughout said particles.

10 Claims, 2 Drawing Sheets

WHITE THERMAL CONTROL SURFACES

This is a divisional of application Ser. No. 08/048,774 filed on Apr. 16, 1993, now U.S. Pat. No. 5,576,696.

TECHNICAL FIELD

The present invention relates to white thermal control surfaces, and to means for preventing darkening of such surfaces from exposure by X-ray and ultraviolet radiation.

BACKGROUND OF THE INVENTION

Zirconium orthosilicate ($ZrSiO_4$), when plasma sprayed onto a substrate, provides an opaque, white surface having reflective, refractory properties. This surface has the potential of being an effective thermal control surface, for preventing overheating from solar absorptivity. The surface can be applied to the outside of structures and inhibits overheating of the structures. The structure can be an enclosure, for instance one containing instrumentation and electronic equipment. The zirconium orthosilicate surface thus inhibits overheating of the enclosure, and whatever equipment is contained within the enclosure. The surface is particularly beneficial in space applications.

However, the zirconium orthosilicate surface, when exposed to X-rays and ultraviolet radiation, darkens. This darkening can result in solar absorption sufficient to cause overheating. In the case of instrumentation and electronic equipment, the overheating can be to the point of failure of the instrumentation and electronic equipment.

DESCRIPTION OF THE PRIOR ART

The publication "Principles and Techniques of Radiation Hardening", by Norman J. Rudie, Vol. 3, Third Edition, page 31–6, Western Periodicals Company, 1986, discloses radiation hardening of an optical material. A small amount of cerium oxide, for instance 1–2 weight percent, is added to the optical material. Cerium has a valence of either +4 or +3, and, according to the Rudie publication, reduces color center formation by the following reactions:

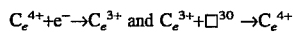

where $e^{31}$ and $\square^+$ represent electrons and holes, respectively. It is stated in the publication: "The holes and electrons trapped by cerium emits light in the ultraviolet region ($\cong 3100$ A for $C_e^{3+}$ and $\cong 2400$ A for $C_e^{4+}$). Thus, the addition of $CeO_2$ shifts the color center formation from the visible to the ultraviolet region. Cerium does not prevent discoloration of glass, but favorably competes with other trapping mechanisms to considerably decrease the visible (optical) discoloration of glass due to radiation." There is no reference in the publication to white coatings.

U.S. Pat. No. 4,680,048 to Motoki et al. discloses doping of silica glass for such applications as optical fibers and lenses for telescopes. The dopant materials include the oxides of Group I metals, aluminum, and other metals such as germanium. There is no reference in this patent to a plasma sprayed, white, thermal control surface. In addition, the Motoki et al. glass is made using a silicon alkoxide. Use of an alkoxide would probably introduce carbon into a surface which has been plasma sprayed onto a substrate, and darken the surface.

U.S. Pat. No. 5,032,420 to Shobert et al. discloses a yellow pigment of zirconium oxide doped with praseodymium ($ZrSiO_4Pr$). The pigment is blended with an amorphous silica, and the blend is electrostatically applied to the inside of light bulbs to diffuse light and absorb UV wavelengths. The color of the blend intensifies with increased absorption of energy, but returns to its initial yellow color upon cooling. Electrostatic deposition is not useful for the present invention, for the reason that the adhesion of a coating so applied is too weak. In addition, the coating of this patent is not white.

The '420 patent makes reference to an earlier patent, U.S. Pat. No. 3,847,639, to Broll et al. The Broll et al. patent discloses coloring pure, colorless, inorganic compounds for the preparation of glaze stable ceramic materials. Examples of useful colored compounds are zirconium silicate doped with praseodymium or vanadium ions. In Example 6 of the patent, a praseodymium oxide is used. The object in this patent is to produce various colored ceramics for aesthetic purposes.

The publication, "Journal of Material Science and Letters" (1991), pages 1171–1172, Oheim et al., entitled "Preparation of Praseodymium-Doped $ZrSiO_4$ by a Sol-Gel Route", discloses a sol-gel method for doping $ZrSiO_4$ with praseodymium. The purpose is to prepare pigments of $ZrSiO_4$. There is no disclosure of preparation of an optically white surface, or prevention of darkening of such a surface.

SUMMARY OF THE INVENTION

The present invention resides in a white thermal control surface resistant to darkening due to exposure by X-rays and ultraviolet radiation. The surface comprises a substrate and a ceramic zirconium orthosilicate coating on said substrate. The zirconium orthosilicate coating is obtained by plasma-spray applying particles of zirconium orthosilicate onto the substrate. The particles of zirconium orthosilicate are doped with an oxide of a +3 valent metal. The metal ions of said +3 valent metal oxide are dispersed substantially uniformly throughout said particles.

Preferred doping materials are oxides of aluminum or lanthanum.

The dopant preferably is added to the zirconium orthosilicate in the amount of about 1%–5% based on the combined weight of the zirconium orthosilicate plus dopant.

Preferably, the particles of doped zirconium orthosilicate are sintered particles having a particle size in the range of about 50 to 150 microns.

Preferably, the zirconium orthosilicate particles of the present invention are prepared by the sol-gel process. A hydrosol of the zirconium orthosilicate, mixed with the dopant, is formed. The hydrosol is formed into microspheres, which are then allowed to gel to form hydrogel microspheres. The hydrogel microspheres are sintered, and then classified to obtain product microspheres having an average particle size in the range of about 50 to 150 microns.

BRIEF DESCRIPTION OF THE DRAWINGS

Further features of the present invention will become apparent to those skilled in the art to which the present invention relates from reading the following specification, with reference to the accompanying drawings, in which.

DESCRIPTION OF PREFERRED EMBODIMENTS

Figure 1:
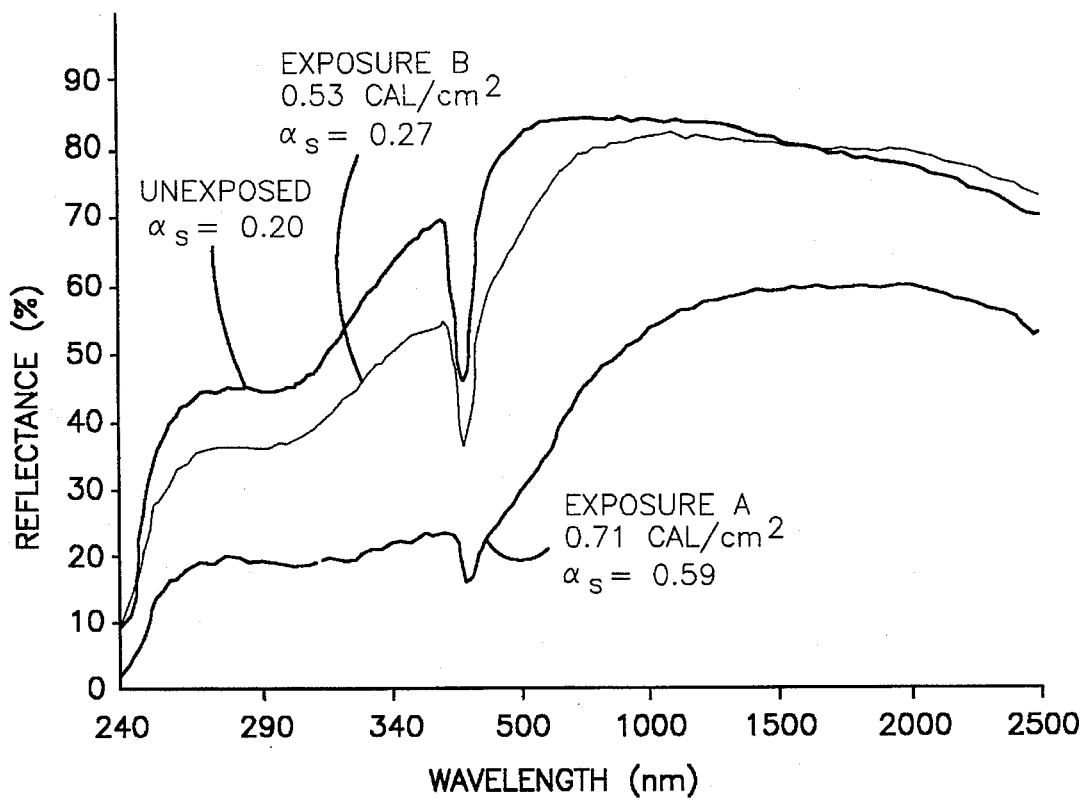
FIG. 1 is a comparative spectral reflectance spectrum showing the effect of X-ray irradiation on samples of white, plasma-sprayed coatings of zirconium orthosilicate.

The substrate in the practice of the present invention can be the surface of a structure, such as an enclosure for instruments and electronic equipment sensitive to exposure to X-rays and ultraviolet radiation, and other structures. One object of the present invention is to provide a housing suitable for space systems. For this reason, the substrate preferably is as thin as possible to reduce weight.

The substrate can be any material capable of withstanding exposure to plasma spraying, including many plastics. It should also provide a surface to which the plasma sprayed coating of the present invention adheres.

One useful substrate material is molybdenum. The molybdenum substrate can have a thickness as little as about 0.005 inch. A thin molybdenum substrate of this thickness can withstand plasma spraying without substrate deformation. Also, the plasma spraying of the compositions of the present invention, onto a molybdenum substrate, results in a strong bond between the coating and the substrate. The plasma spraying can be accomplished without substantially preheating the substrate, and without any other surface treatment of the substrate which could result in substrate deformation, particularly in the case of thin substrates. Also, water cooling of the substrate during the plasma spraying step is not necessary, although preferably the substrate is maintained at a relatively low temperature by air cooling on the backside of the substrate during the plasma spray step.

Other suitable substrate materials, useful in the practice of the present invention, are aluminum, nickel, tantalum, niobium, tungsten, copper, and alloys thereof. Generally, the thickness of the substrate will be less than one inch.

If desired, the substrate can be coated with an intermediate bond coat alloy prior to application of the coatings of the present invention. However, typically, a bond coat is not needed.

The dopant of the present invention is preferably a metal oxide. The metal of the metal oxide is a +3 valent metal. Preferred metal oxides are aluminum(III) oxide ($Al_2O_3$) and lanthanum(III) oxide ($La_2O_3$). Examples of other +3 valent metal oxides which may be used are cerium(III) oxide, praseodymium(III) oxide and other oxides of +3 valent metals of the lanthanide series, boron oxide and oxides of other Group 3 metals.

The dopant of the present invention is dispersed substantially uniformly throughout the particles of zirconium orthosilicate. The dopant is part of the crystal lattice of essentially each crystal of zirconium orthosilicate. Preferably, the amount of dopant is about 1%–5% based on the total weight of zirconium orthosilicate plus dopant.

Although not to be bound by any theory, it is believed the discoloration of the plasma-sprayed zirconium orthosilicate is due to the presence of cation vacancies ($V_c$) in the zirconium orthosilicate crystals. In fact, it is believed that the discoloration is directly proportional to the number of cation vacancies.

This theory is based on the Third Law of Thermodynamics which dictates that a perfect crystal can be grown only at absolute zero (0 K). Therefore, all normally grown crystals will contain cation vacancies ($V_c$), which are lattice sites where a metal ion ($M^+$) is missing and anion vacancies ($V_a$), which are lattice sites where a negative ion ($X_-$) is missing. The Second Law of Thermodynamics requires the equilibrium $[V_c][V_a] = K$ where K is an equilibrium constant. If a crystal such as $M^{+4}X^{-4}$ is doped with $M^{+3}$, charge neutrality requires a decrease in the cation vacancies ($V_c$) and consequently an inhibition of darkening by radiation.

The doped orthosilicate particles of the present invention, suitable for plasma spraying, containing dopant dispersed substantially uniformly throughout the particles of zirconium orthosilicate, can be prepared using the sol-gel process. The basic sol-gel process is well known. In the present invention, a dry mixture of particles of zirconium oxide precursor and silicon oxide precursor, in stoichiometric proportions, is prepared. The zirconium oxide and silicon oxide precursors should have a high degree of purity to obtain a white coating. The mole ratio of zirconium oxide to silicon oxide is essentially 1:1. The dopant metal oxide particles are then added to, and blended with, the zirconium dioxide and silicon dioxide particles in the amount desired. The dopant particles also preferably have a high degree of purity.

A hydrosol is formed by adding the particulate mixture to a mineral acid solution, with mixing. Sulfuric acid and hydrochloric acid are commonly used for forming the hydrosol. The solution is maintained at a low pH, for instance about 1–3. The concentration of the oxides in the acid solution is normally about 10%–22% by weight. The normality of the acid is normally between 3N and 18N.

The solution is heated to over 60° C. and stirred. This provides good mixing and allows the starting materials to dissolve. The heating and mixing are continued for a period of about eight hours. The pH and viscosity are routinely checked.

After mixing, the sol is filtered and formed into microspheres by dropping. The sol is dropped into a bath through an oscillating nozzle forming gelled microspheres. In the bath, the microspheres gel by aging, following typical sol-gel procedures. Aging occurs quickly. Silica hydrosol is an unstable solution of silicic acid and zirconium and silica salt. The silicic acid polymerizes, increasing the molecular weight of the silica and the viscosity of the hydrosol, forming the hydrogel microspheres.

Following formation of the hydrogel microspheres, the microspheres are then rinsed with distilled water and alcohol and dried. The microspheres are then calcined for eight hours at a temperature of 1,000°–1,200° C. The microspheres are then size classified, by sieving through a series of increasing mesh size screens, to provide a product having a particle size in the range of about 50 to about 150 microns, suitable for plasma spray application.

The plasma spray process is well known and fully described in numerous prior patents. A gas is ionized and the resulting plasma is used as a heating and carrier medium. A preferred gas consists of an inert primary gas, such as argon, and a secondary gas, such as hydrogen. The stream of the gas is ionized by being passed through an electric arc.

The plasma expands due to its high heat and kinetic energy and produces a high velocity directional jet. The doped zirconium orthosilicate particles are injected into the rapidly flowing heated stream and in the stream are heated to a sufficiently high temperature for the particles to become softened or melted. The plasma jet is directed at the target substrate, depositing the molten or softened particles onto the substrate. The deposit is allowed to cool by exposure to ambient conditions, aided, if desired, by the application of cooling air to the backside of the substrate. This allows the particles to become bonded to the substrate and to each other in the formation of a thin layer.

For purposes of the present application, the term "plasma spray process" includes derivatives of the process which use an inert gas and are capable of heating the doped zirconium orthosilicate particles to a high enough temperature to soften or melt the particles. Included is detonation gun, flame, and high velocity Oxygen-Fuel (HVOF) spraying. Preferred parameters of plasma spraying are set forth in the following Table 1.

TABLE 1

Gun Motion

Traverse Speed - 880 mm/seconds
    Step Increment - 3.175 mm

Spray Gun

Primary Gas - Argon
        Pressure - 100 psi
        Flow - 80 SCFH - Standard cubic feet/hr
    Secondary Gas - Hydrogen
        Pressure - 50 psi
        Flow - 13 SCFH - Standard cubic feet/hr
    Nozzle - Gh
    Current - 500 amps
    Voltage - 70 volts
    Power - 35 KW Powder Feed Unit Powder Port - #2
    Powder Shaft - A
    Carrier Gas Indicator - 37
    Air Vibrator - 10 psig
    Powder Feed Rate Indicator - 105
    Powder Feed Rate - 33 grams/minute Preheat Gun to Work Distance - 3.5 inches
    # of Cycles - 1
    Traverse Speed - 800 mm/seconds Spray Gun to Work Distance - 3.5 inches
    # of Cycles - 4 to 5
    Traverse Speed - 800 mm/seconds As indicated in Table 1, the coating is made using 4 to 5 passes of the plasma spray gun. This produces a thin coating.

An experimental study was carried out to quantify the performance of the ceramic coating materials of the present invention when exposed to a radiation environment.

Samples were prepared. The first sample was a zirconium orthosilicate, thermal control coating which contained no metal oxide doping. This sample was the subject of the test of FIG. 1. The second sample was a zirconium orthosilicate coating doped with 1% lanthanum(III) oxide ($La_2O_3$). This sample was the subject of the test of FIG. 2. The third sample was a zirconium orthosilicate coating doped with 5% aluminum(III) oxide ($Al_2O_3$). This sample was the subject of the test of FIG. 3. The fourth sample was also a zirconium orthosilicate coating doped with 5% aluminum(III) oxide ($Al_{23}$). This sample was the subject of the test of FIG. 4.

All of the samples were the same, except for the compositional differences noted above, and were prepared using the same procedure. All were prepared by the sol-gel process, described above, and were plasma sprayed onto a molybdenum substrate using the parameters of Table 1. All of the coatings were white.

To duplicate space radiation, which includes infrared radiation, the first and fourth samples were pre-exposed to infrared radiation. A laser source was used. Following infrared exposure, samples 1 and 4 were then exposed to X-ray radiation using a Blackjack pulsed X-ray source. Samples 2 and 3 were exposed to the same X-ray radiation, used to expose samples 1 and 4, with no pre-exposure to infrared radiation. The X-ray radiation of all of the samples was at a level that would be expected in Earth orbit.

In the X-ray radiation, a computer code was used to match the depth-dose profiles for the neon and aluminum X-ray lines, to ensure that the energies deposited, per unit volume of coating, were as close to each other as possible. The energy deposited by the flash X-ray pulse from neon, at 0.53 calories per centimeter square, is nearly the same as the flash X-ray pulse produced by aluminum at 0.17 calories per centimeter square.

Samples were tested for solar absorptivity ($\alpha_s$) before X-ray radiation, and after X-ray radiation. In this respect, the radiation was selective, in the sense that one area of each sample was not exposed to X-ray radiation, one area was exposed to X-ray radiation at one level of intensity, and a second area was exposed to X-ray radiation at another level of intensity. The "before" measurement was obtained on the area not exposed to radiation. The results of the tests are given in the following Table 2.

TABLE 2

| Sample Number | Material | X-ray Line | Fluence (Cal/cm$^2$) | Peak Dose (Cal/gram) | $\alpha_s$ Before | $\alpha_s$ After | $\Delta \alpha_s$ |
| --- | --- | --- | --- | --- | --- | --- | --- |
| 1 | $ZrSiO_4$[1] | Neon | 0.53* | 577 | 0.20 | 0.27 | +0.07 |
|  |  |  | 0.71* | 872 | 0.20 | 0.59 | +0.39 |
| 2 | $ZrSiO_4$ + 1% $La2O_3$ | Neon | 0.53* | 592 | 0.28 | 0.29 | +0.01 |
|  |  |  | 0.71* | 902 | 0.28 | 0.29 | +0.01 |
| 3 | $ZrSiO_4$ + 5% $Al2O_3$ | Aluminum | 0.19# | 728 | 0.30 | 0.27 | −0.03 |
|  |  |  | 0.18# | 676 | 0.30 | 0.31 | +0.01 |
| 4 | $ZrSiO_4$ + 5% $Al2O_3$ | Aluminum | 0.16# | 592 | 0.25 | 0.24 | −0.01 |
|  |  |  | 0.17# | 631 | 0.25 | 0.23 | −0.02 |

[1]Laser irradiation prior to X-ray tests
*Neon Lines
Aluminum lines - the fluence at 0.17 cal/cm$^2$ of aluminum irradiation is very nearly equivalent to the fluence at 0.53 cal/cm$^2$ of neon irradiation In Table 2, the first column gives the sample number. The second column gives the composition of each sample. The third column gives the X-ray line at which the X-ray intensity was noted for each sample. The fourth column gives the intensity of the X-ray exposure, in calories per centimeter square, at the X-ray line of the third column (either aluminum or neon). The fifth column gives the peak dose of X-ray exposure in terms of calories per gram of sample, associated with each X-ray line fluence.

In the remaining three columns, the heading "$\alpha_s$ Before" means solar absorptivity of the sample before X-ray radiation. In this respect, again, this was after infrared radiation in samples 1 and 4. The heading "$\alpha_s$ After" means the solar absorptivity of the sample after X-ray radiation. The heading "$\Delta \alpha_s$" means the difference between the solar absorptivity before X-ray radiation and the solar absorptivity after X-ray radiation.

In all instances, the solar absorptivity was determined following conventional procedures. A Gier-Dunkle MS-251 solar reflectometer was used to measure absorptivity. A Beckman DK-2A Spectrophotometer can also be used. The absorptivity is measured on a scale of zero to one. A low value, e.g., 0.1 to 0.2, indicates high reflectivity and low absorptivity.

As indicated in Table 2, the sample of undoped zirconium orthosilicate (sample 1), when exposed to infrared radiation, but prior to X-ray radiation, had a solar absorptivity of 0.2, and showed no visible coloration. This sample, after exposure to X-ray radiation, showed a slight darkening, to 0.27, at a fluence of 0.53 calories per square centimeter. The change in solar absorptivity was 0.07. When exposed to a higher intensity of X-ray radiation, at a fluence of 0.71 calories per square centimeter, or 872 calories per gram, the undoped zirconium orthosilicate showed a substantial increase in solar absorptivity, to 0.59, or a difference of 0.39.

With 1% lanthanum(III) oxide doping (sample 2), (but without infrared exposure), the same material showed a difference or increase in solar absorptivity of only 0.01, due to exposure to X-ray radiation, at both low and high dose levels of 592 and 902 calories per gram, respectively.

Similarly, with 5% doping with aluminum oxide, the same material showed an increase in solar absorptivity, at both X-ray dose levels of 728 and 676 calories per gram, of 0.01 or less. Actually, the higher dose level of 728 calories per gram gave a slight decrease in solar absorptivity.

Concerning sample 4, the same material, doped with 5% aluminum oxide, and pre-exposed to infrared radiation, showed similar very low levels of change of solar absorptivity, of minus 0.01 and minus 0.02, at dose levels of 592 and 631 calories per gram, respectively.

From the data of Table 2, it is apparent that the doping provides significantly better protection against darkening by X-ray radiation.

Figure 2:
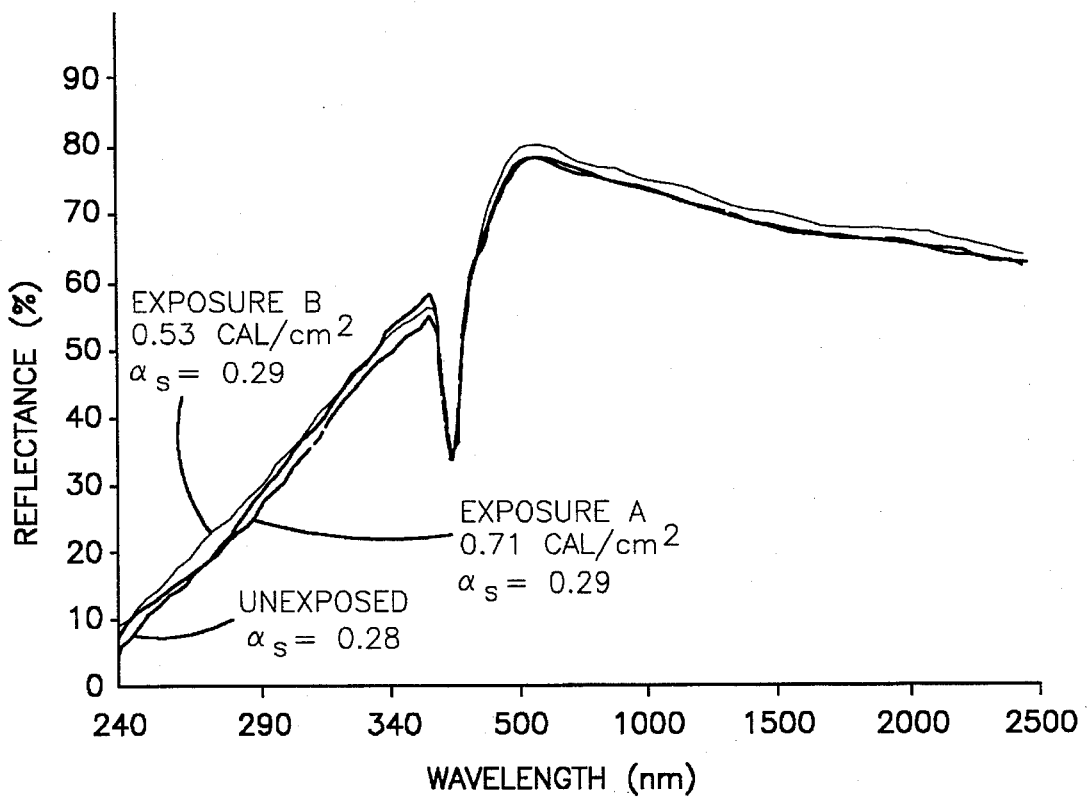
FIG. 2 is a spectral reflectance spectrum showing the effect of X-ray irradiation on samples of white, plasma-sprayed coatings of zirconium orthosilicate doped with 1% lanthanum oxide.
Figure 3:
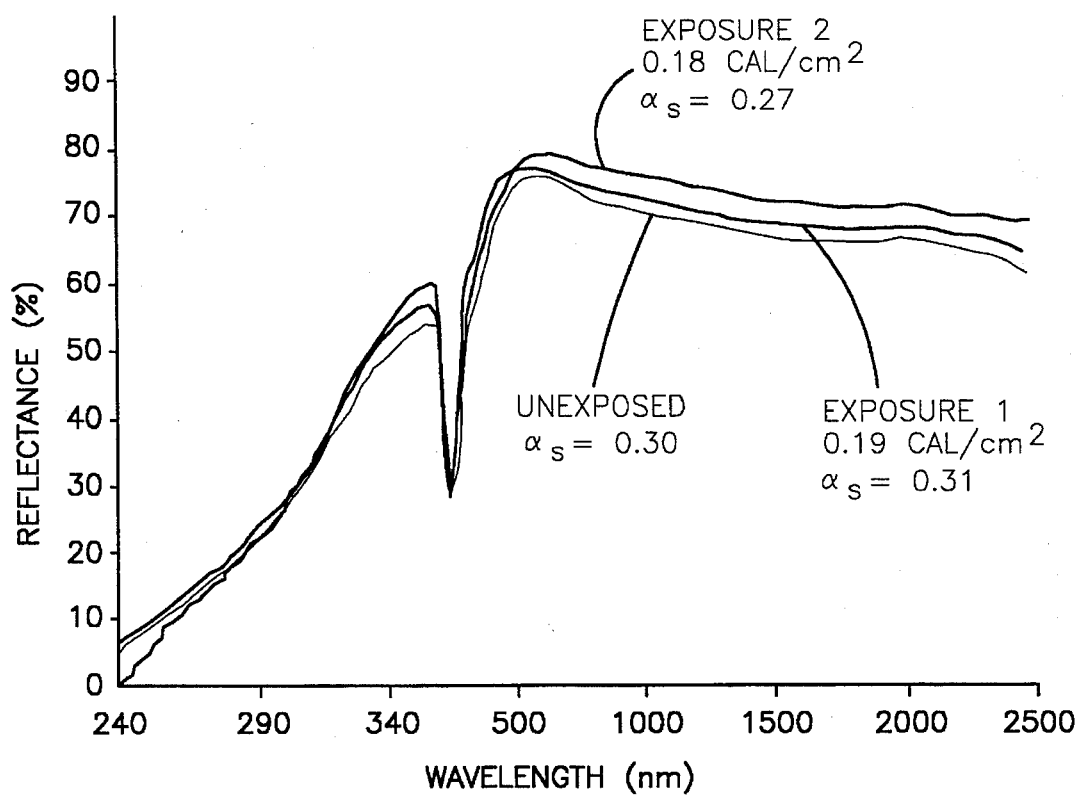
FIG. 3 is a spectral reflectance spectrum showing the effect of X-ray irradiation on samples of white coatings of zirconium orthosilicate doped with 5% aluminum oxide.
Figure 4:
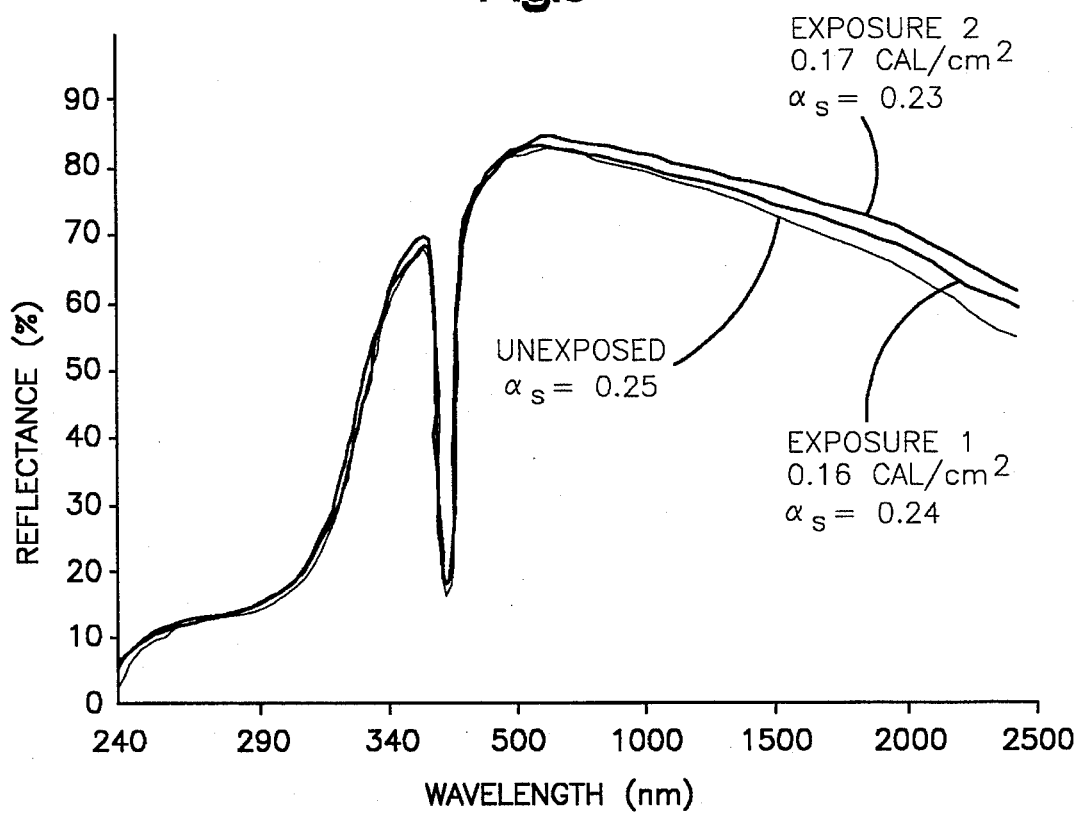
FIG. 4 is a spectral reflectance spectrum showing the effect of X-ray irradiation on additional samples of white coatings of zirconium orthosilicate also doped with 5% of aluminum oxide. The samples prior to X-ray irradiation were exposed to laser beam irradiation.

The beneficial effects of the present invention also become evident from the reflectance spectrums of FIGS. 1–4. FIG. 1 is a reflectance spectrum for the first sample, undoped zirconium orthosilicate. FIG. 2 is a reflectance spectrum for the second sample, zirconium orthosilicate doped with 1% lanthanum(III) oxide. FIG. 3 is a reflectance spectrum for the third sample, zirconium orthosilicate doped with 5% aluminum(III) oxide. FIG. 4 is a reflectance spectrum for the fourth sample, zirconium orthosilicate doped with 5% aluminum(III) oxide. Again, the samples of FIGS. 1 and 4 were pre-exposed to infrared radiation, prior to X-ray radiation.

As shown in FIG. 1, sample 1, prior to X-ray radiation, had a high reflectance, particularly in the visible and UV ranges. When exposed to X-ray radiation, at 0.53 calories per square centimeter, the reflectance was reduced somewhat. As shown in FIG. 1, the reflectance was substantially reduced following exposure at 0.71 calories per square centimeter.

In contrast, sample 2, as shown in FIG. 2, exhibited very little change in reflectance across the wavelength spectrum following exposure to X-ray radiation at either 0.53 calories per square centimeter or 0.71 calories per square centimeter. Similar results were achieved with samples 3 and 4, as shown in FIGS. 3 and 4.

From the above description of the invention, those skilled in the art will perceive improvements, changes, and modifications. Such improvements, changes and modifications within the skill of the art are intended to be covered by the appended claims.

Having described the invention, the following is claimed:

1. A method of preparing a white thermal control surface which is resistant to darkening due to exposure to X-rays and ultraviolet radiation comprising the steps of:
   (a) providing a substrate; and
   (b) plasma spray-applying onto said substrate particles of zirconium orthosilicate, said zirconium orthosilicate being doped with a dopant which is a metal oxide of a +3 valent metal.

2. The method of claim 1 wherein said dopant is added to the zirconium orthosilicate in the amount of about 1%–5% weight percent based on the weight of orthosilicate plus dopant.

3. The method of claim 2 wherein said particles are sintered particles classified to a particle size in the range of about 50 to 150 microns.

4. The method of claim 3 wherein said dopant is aluminum(III) oxide or lanthanum(III) oxide.

5. The method of claim 4 wherein said particles are prepared by the steps of:
   (a) forming a hydrosol of zirconium orthosilicate blended with of said dopant;
   (b) forming microspheres of said hydrosol;
   (c) allowing said microspheres to gel to form microspheres of hydrogel;
   (d) drying and sintering said hydrogel microspheres;
   (e) classifying said sintered microspheres to obtain sintered microspheres having a particle size in the range of about 50–150 microns.

6. A structure comprising a white thermal control surface prepared by the method of claim 1.

7. An enclosure for instruments or electronic equipment therein, which enclosure is sensitive to X-rays and ultraviolet radiation wherein said enclosure comprises a surface prepared by the method of claim 1.

8. A method of preparing a ceramic, white, thermal control surface which is resistant to darkening due to exposure to X-rays and ultraviolet radiation, comprising the steps of:
   (a) providing a substrate;
   (b) forming a hydrosol of zirconium oxide and silicon dioxide in combination with about 1% to 5% by weight of a dopant which is a metal oxide of a +3 valent metal;
   (c) forming microspheres of said hydrosol;
   (d) allowing said hydrosol microspheres to gel to form hydrogel microspheres;
   (e) sintering said hydrogel microspheres;
   (f) classifying said sintered hydrogel microspheres to obtain a sintered microsphere product having a particle size in the range of 50–150 microns; and
   (g) plasma spray applying said sintered microspheres onto said substrate to prepare said thermal control surface.

9. A structure comprising a white thermal control surface prepared by the method of claim 8.

10. An enclosure for instruments or electronic equipment therein, which enclosure is sensitive to X-rays and ultraviolet radiation wherein said enclosure comprises a surface prepared by the method of claim 8.

\* \* \* \* \*